United States Patent
Maeda et al.

(10) Patent No.: US 11,530,854 B2
(45) Date of Patent: Dec. 20, 2022

(54) EJECTOR REFRIGERATION CYCLE

(71) Applicant: DENSO CORPORATION, Kariya (JP)

(72) Inventors: Hiroshi Maeda, Kariya (JP); Hiroshi Oshitani, Kariya (JP); Yoichiro Kawamoto, Kariya (JP); Yohei Nagano, Kariya (JP); Daisuke Sakurai, Kariya (JP); Masahiro Ito, Kariya (JP); Hang Yuan, Kariya (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 16/743,804

(22) Filed: Jan. 15, 2020

(65) Prior Publication Data

US 2020/0149784 A1 May 14, 2020

Related U.S. Application Data

(63) Continuation of application No. PCT/JP2018/024260, filed on Jun. 27, 2018.

(30) Foreign Application Priority Data

Jul. 19, 2017 (JP) .............................. JP2017-139747

(51) Int. Cl.
  *F25B 5/02* (2006.01)
  *F25B 1/06* (2006.01)
  (Continued)

(52) U.S. Cl.
  CPC ............... *F25B 41/00* (2013.01); *F25B 1/06* (2013.01); *F25B 5/02* (2013.01); *F25B 9/08* (2013.01);
  (Continued)

(58) Field of Classification Search
  CPC .... F25B 5/02; F25B 9/08; F25B 41/40; F25B 39/02; F25B 41/00; F25B 2341/0013;
  (Continued)

(56) References Cited

U.S. PATENT DOCUMENTS 7,254,961 B2 * 8/2007 Oshitani ................. F25B 41/00
  62/500
10,018,386 B2 * 7/2018 Nishijima ................. F04F 5/20
  (Continued)

FOREIGN PATENT DOCUMENTS

JP  2007078339 A  3/2007
JP  5083106 B2  11/2012
  (Continued)

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

An ejector refrigeration cycle includes a compressor, a radiator, a branch portion, an ejector, a suction side decompressor, a windward evaporator, and a leeward evaporator. The ejector includes a nozzle portion and a pressure increasing portion. The windward evaporator and the leeward evaporator include at least one outflow side evaporation portion. The leeward evaporator includes a suction side evaporation portion. An outflow side evaporation temperature is a refrigerant evaporation temperature in the at least one outflow side evaporation portion of the leeward evaporator. A suction side evaporation temperature is a refrigerant evaporation temperature in the suction side evaporation portion of the leeward evaporator. At least one of the nozzle portion or the suction side decompressor is configured to adjust a refrigerant passage area such that a temperature difference between the outflow side evaporation temperature and the suction side evaporation temperature is at or below a predetermined reference temperature difference.

5 Claims, 8 Drawing Sheets

(51) Int. Cl.
*F25B 41/00* (2021.01)
*F25B 9/08* (2006.01)
*F25B 40/06* (2006.01)
*F25B 41/40* (2021.01)

(52) U.S. Cl.
CPC .............. *F25B 40/06* (2013.01); *F25B 41/40* (2021.01); *F25B 2341/0013* (2013.01)

(58) Field of Classification Search
CPC .... F25B 2700/21175; F25B 2700/1931; F25B 2700/2104; F25B 5/04; B60H 1/3211
See application file for complete search history.

(56) References Cited

U.S. PATENT DOCUMENTS

| | | |
|---|---|---|
| 2007/0000262 A1 | 1/2007 | Ikegami et al. |
| 2009/0095013 A1 | 4/2009 | Ikegami et al. |
| 2010/0319393 A1 | 12/2010 | Ikegami et al. |

FOREIGN PATENT DOCUMENTS

| | | | | |
|---|---|---|---|---|
| JP | 2016102594 A * | 6/2016 | ................ | F25B 5/00 |
| WO | WO-2016084339 A1 * | 6/2016 | ................ | F25B 5/00 |
| WO | WO-2019/017167 A1 | 1/2019 | | |
| WO | WO-2019/017169 A1 | 1/2019 | | |

\* cited by examiner

EJECTOR REFRIGERATION CYCLE

CROSS REFERENCE TO RELATED APPLICATION

The present application is a continuation application of International Patent Application No. PCT/JP2018/024260 filed on Jun. 27, 2018, which designated the U.S. and claims the benefit of priority from Japanese Patent Application No. 2017-139747 filed on Jul. 19, 2017. The entire disclosures of all of the above applications are incorporated herein by reference.

TECHNICAL FIELD

The present disclosure relates to an ejector refrigeration cycle having an ejector.

BACKGROUND

An ejector refrigeration cycle is a vapor-compression refrigeration cycle device that has an ejector serving as a refrigerant decompressor. In the ejector refrigeration cycle, pressure of the refrigerant to be drawn into the compressor can be increased by the ejector to be higher than pressure at which the refrigerant evaporates in the evaporator. Accordingly, in the ejector refrigeration cycle, power consumption of the compressor can be reduced, and coefficient of performance (COP) of the cycle can be improved.

SUMMARY

An ejector refrigeration cycle of an aspect of the present disclosure includes a compressor, a radiator, a branch portion, an ejector, a suction side decompressor, a windward evaporator, and a leeward evaporator. The compressor is configured to compress a refrigerant and discharge the refrigerant. The radiator is configured to release heat of the refrigerant that flowed out of the compressor. The branch portion is configured to divide a flow of the refrigerant that flowed out of the radiator into one flow and another flow. The ejector has a nozzle portion configured to decompress the refrigerant of the one flow that was divided at the branch portion, the refrigerant being ejected from the nozzle portion, a refrigerant suction port through which the refrigerant is drawn by a suction force of the ejected refrigerant, and a pressure increasing portion in which the refrigerant ejected from the nozzle portion and the refrigerant drawn through the refrigerant suction port are mixed, the pressure increasing portion being configured to increase a pressure of the mixture. The suction side decompressor is configured to decompress the refrigerant of the other flow that was divided at the branch portion. The windward evaporator is configured to exchange heat between the refrigerant and a cooling target fluid to evaporate the refrigerant. The leeward evaporator is configured to exchange heat between the refrigerant and the cooling target fluid that passed through the windward evaporator to evaporate the refrigerant. The windward evaporator includes at least one outflow side evaporation portion of a plurality of outflow side evaporation portions configured to evaporate the refrigerant that flowed out of the pressure increasing portion and allow the refrigerant to flow to an inlet of the compressor. The leeward evaporator includes at least one outflow side evaporation portion of the plurality of outflow side evaporation portions, and a suction side evaporation portion configured to evaporate the refrigerant that was decompressed by the suction side decompressor and allow the refrigerant to flow to the refrigerant suction port. At least one of the nozzle portion or the suction side decompressor is configured to change an area of a refrigerant passage. An outflow side evaporation temperature is a refrigerant evaporation temperature in the at least one outflow side evaporation portion of the leeward evaporator. A suction side evaporation temperature is a refrigerant evaporation temperature in the suction side evaporation portion of the leeward evaporator. At least one of the nozzle portion or the suction side decompressor is configured to adjust the area of the refrigerant passage such that a temperature difference between the outflow side evaporation temperature and the suction side evaporation temperature is at or below a predetermined reference temperature difference.

An ejector refrigeration cycle of another aspect of the present disclosure includes a compressor, a radiator, a branch portion, an ejector, a suction side decompressor, a windward evaporator, and a leeward evaporator. The compressor is configured to compress a refrigerant and discharge the refrigerant. The radiator is configured to release heat of the refrigerant that flowed out of the compressor. The branch portion is configured to divide a flow of the refrigerant that flowed out of the radiator into one flow and another flow. The ejector has a nozzle portion configured to decompress the refrigerant of the one flow that was divided at the branch portion, the refrigerant being ejected from the nozzle portion, a refrigerant suction port through which the refrigerant is drawn by a suction force of the ejected refrigerant, and a pressure increasing portion in which the refrigerant ejected from the nozzle portion and the refrigerant drawn through the refrigerant suction port are mixed, the pressure increasing portion being configured to increase a pressure of the mixture. The suction side decompressor is configured to decompress the refrigerant of the other flow that was divided at the branch portion. The windward evaporator is configured to exchange heat between the refrigerant and a cooling target fluid to evaporate the refrigerant. The leeward evaporator is configured to exchange heat between the refrigerant and the cooling target fluid that passed through the windward evaporator to evaporate the refrigerant. The windward evaporator includes at least one outflow side evaporation portion of a plurality of outflow side evaporation portions configured to evaporate the refrigerant that flowed out of the pressure increasing portion and allow the refrigerant to flow to an inlet of the compressor. The leeward evaporator includes at least one outflow side evaporation portion of the plurality of outflow side evaporation portions, and a suction side evaporation portion configured to evaporate the refrigerant that was decompressed by the suction side decompressor and allow the refrigerant to flow to the refrigerant suction port. At least one of the nozzle portion or the suction side decompressor is configured to change an area of a refrigerant passage. A nozzle side refrigerant flow rate is a flow rate of the refrigerant flowing from the branch portion into the nozzle portion. A suction side refrigerant flow rate is a flow rate of the refrigerant flowing from the branch portion into the suction side decompressor. An outflow side heat exchange area is an area of a heat exchange portion of the at least one outflow side evaporation portion of the leeward evaporator. A suction side heat exchange area is an area of a heat exchange portion of the suction side evaporation portion of the leeward evaporator. An outflow side evaporation temperature is a refrigerant evaporation temperature in the at least one outflow side evaporation portion of the leeward evaporator. A suction side evaporation temperature is a refrigerant evaporation temperature in the suction side evaporation portion of the leeward evaporator. At least one of the nozzle portion or the suction side decompressor is configured to adjust the area of the refrigerant passage such that a flow rate proportion of the suction side refrigerant flow rate in a sum of the suction side refrigerant flow rate and the nozzle side refrigerant flow rate is equal to a predetermined reference flow rate proportion. An area proportion of the suction side heat exchange area in a sum of the suction side heat exchange area and the outflow side heat exchange area is designed such that a temperature difference between the outflow side evaporation temperature and the suction side evaporation temperature is at or below a predetermined reference temperature difference while the flow rate proportion is equal to the reference flow rate proportion.

The outflow side evaporation temperature may be an average value of refrigerant evaporation temperatures at several points of the outflow evaporation portion of the leeward evaporator, or an average value of the highest refrigerant evaporation temperature in the outflow side evaporation portion and the lowest refrigerant evaporation temperature in the outflow side evaporation portion of the leeward evaporator.

The suction side evaporation temperature may be an average value of refrigerant evaporation temperatures at several points of the suction side evaporation portion of the leeward evaporator, or an average value of the highest refrigerant evaporation temperature in the suction side evaporation portion and the lowest refrigerant evaporation temperature in the suction side evaporation portion.

EMBODIMENTS

Comparative Example

Figure 1:
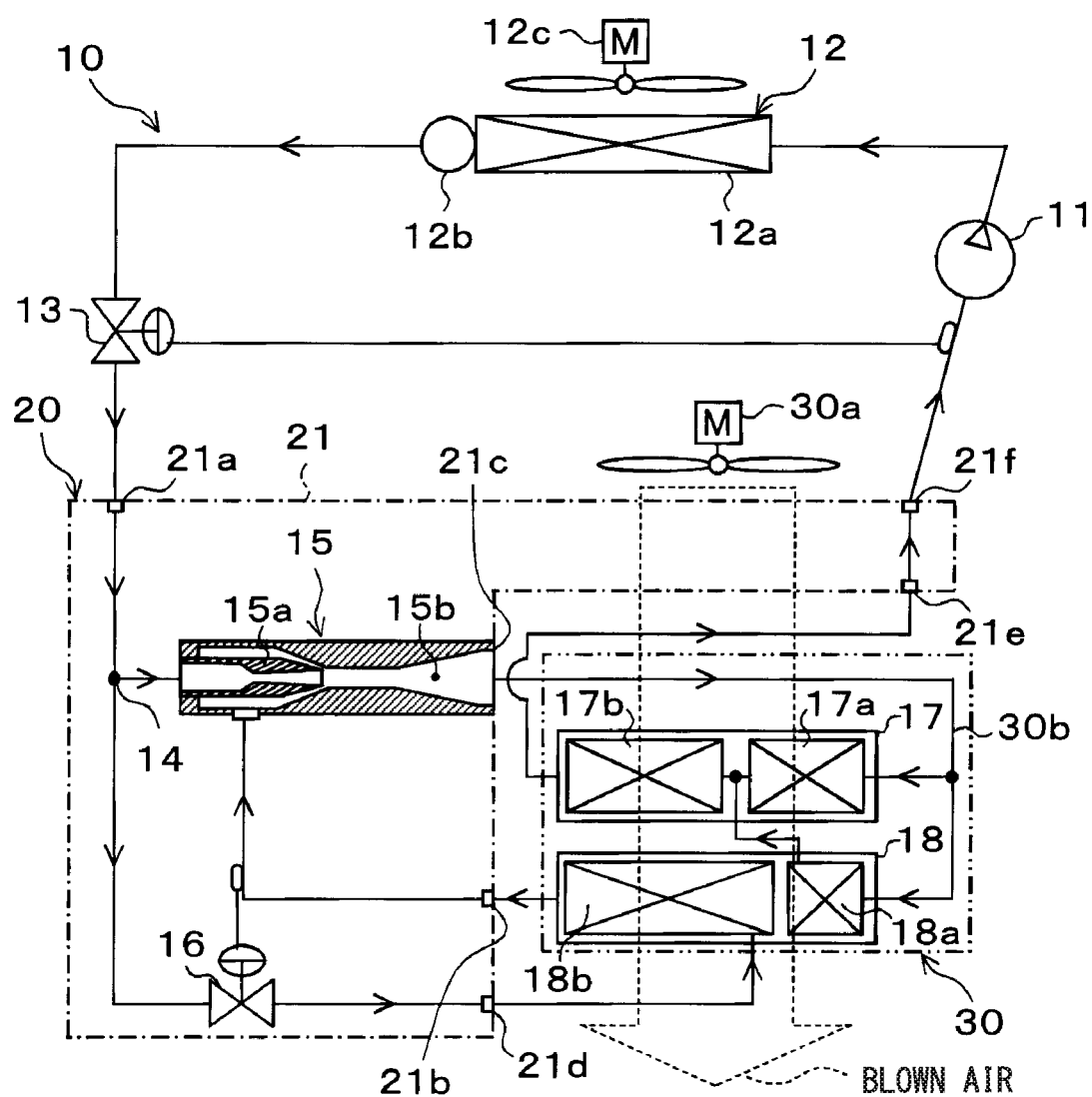
FIG. 1 is a schematic overall view illustrating an ejector refrigeration cycle according to at least one embodiment of the present disclosure.

An ejector refrigeration cycle of a comparative example includes a branch portion, a suction side decompressor, a suction side evaporation portion, an outflow side evaporation portion and the like.

The branch portion is configured to divide the flow of the refrigerant on the high-pressure side in the cycle, to allow the refrigerant of one of the divided flow to flow toward a nozzle portion of the ejector, and to allow the refrigerant of the other flow to flow toward the suction side decompressor. The outflow side evaporation portion is a heat exchange portion configured to exchange heat between the cooling target fluid and the refrigerant that flowed out of the diffuser portion of the ejector to evaporate the refrigerant.

The suction side evaporation portion and the outflow side evaporation portion are integrated with each other to be an evaporator unit. In the evaporator unit, the branch portion, the ejector, the suction side decompressor, the windward evaporator, the leeward evaporator and the like are integrated (unitized) with each other.

In the evaporator unit of the comparative example, the leeward evaporator is sectioned into evaporation portions. The windward evaporator includes an outflow side evaporation portion for evaporating the refrigerant whose pressure was increased by the diffuser portion. The leeward evaporator includes an outflow side evaporation portion and a suction side evaporation portion for evaporating the refrigerant decompressed by the suction side decompressor.

A part of the outflow side evaporation portion of the windward evaporator and the outflow side evaporation portion of the leeward evaporator are connected in parallel with each other in the refrigerant flow.

In the ejector refrigeration cycle of the comparative example, the refrigerant evaporation temperature in the outflow side evaporation portion may be higher than the refrigerant evaporation temperature in the suction side evaporation portion due to the pressure increasing effect of the diffuser portion. Accordingly, the temperature of the cooling target fluid (air blown into an air-conditioning target space, for example) cooled by the leeward evaporator may be non-uniform.

Accordingly, if the flow rate proportion is adjusted such that the cooling capacities of the outflow side evaporation portion and the suction side evaporation portion approach the maximum value, the non-uniformity of the temperature of the cooling target fluid may increase.

Hereinafter, embodiments for carrying out the present disclosure will be described with reference to the drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The parts may be combined even if it is not explicitly described that the parts can be combined. The embodiments may be partially combined even if it is not explicitly described that the embodiments can be combined, provided there is no harm in the combination.

First Embodiment

Hereinafter, a first embodiment of the present disclosure will be described with reference to FIGS. 1 to 4. An ejector refrigeration cycle 10 of the present embodiment is used for a vehicular air-conditioning device. The ejector refrigeration cycle 10 is configured to cool blown air to be conveyed to a passenger compartment that is a cooling target space. Accordingly, the blown air is a cooling target fluid of the ejector refrigeration cycle 10.

In the ejector refrigeration cycle 10, an HFC based refrigerant (specifically, R134a) is employed as the refrigerant, and a subcritical refrigeration cycle in which refrigerant pressure on a high-pressure side does not exceed a critical pressure of the refrigerant is formed. Moreover, refrigerant oil for lubricating the compressor 11 is mixed in the refrigerant and a part of the refrigerant oil circulates in the cycle together with the refrigerant.

Components in the ejector refrigeration cycle 10 will be described with reference to the overall view shown in FIG. 1.

The compressor 11 is configured to draw in, compress, and discharge the refrigerant in the ejector refrigeration cycle 10. The compressor 11 is disposed in the engine compartment of the vehicle. In the present embodiment, the compressor is an electric compressor in which a fixed displacement compression mechanism whose discharge capacity is fixed is driven and rotated by an electric motor. The rotation speed (that is, refrigerant discharge capacity) of the compressor 11 is controlled by control signals outputted from an air-conditioning controller 40 described later.

A refrigerant inlet side of a condensing portion 12a of a radiator 12 is connected to a discharge port of the compressor 11. The radiator 12 is a heat-releasing heat exchanger that cools the refrigerant having a high pressure by releasing heat of the refrigerant having the high pressure. Specifically, the radiator 12 performs a heat exchange between the refrigerant having the high pressure, which is discharged by the compressor 11, and air (i.e., outside air) taken in from an outside of the passenger compartment so that the refrigerant having the high pressure releases heat to the outside air. The outside air is taken in by a cooling fan 12c and discharged by the cooling fan 12c toward the radiator 12.

More specifically, the radiator 12 is a condenser integrally formed with a receiver. The radiator 12 includes the condensing portion 12a and a receiver 12b. The compressor 11 discharges a gas refrigerant having a high pressure. The condensing portion 12a is a heat exchanging portion that condenses the gas refrigerant having the high pressure by performing a heat exchange between the gas refrigerant having the high pressure and the outside air discharged from the cooling fan 12c. In the heat exchange, the condensing portion 12a releases heat of the gas refrigerant having the high pressure to condense the gas refrigerant having the high pressure. The receiver 12b is a refrigerant container that separates gas and liquid of a refrigerant that flowed out from the condensing portion 12a and accumulates an excess liquid-phase refrigerant.

The cooling fan 12c is an electric blower whose rotation speed (that is, a blowing capacity) is controlled by a control voltage output from the air-conditioning controller 40.

A refrigerant outlet of the receiver 12b of the radiator 12 is connected to an inlet of a thermosensitive expansion valve 13. The thermosensitive expansion valve 13 decompresses the high-pressure refrigerant that flowed out of the receiver 12b such that the high-pressure refrigerant becomes an intermediate-pressure refrigerant. Further, the thermosensitive expansion valve 13 the controls a flow rate of the refrigerant circulating in the refrigeration circuit. As such, the thermosensitive expansion valve 13 may be referred to as a high-pressure side decompressor.

The thermosensitive expansion valve 13 is configured to change a throttle degree (that is, a refrigerant passage area) such that a superheat degree of the refrigerant on an outlet side of outflow side evaporation portions 17a, 18a, 17b of an evaporator unit described later (specifically, the refrigerant that flowed out of the outflow side evaporation portions) approaches a predetermined outflow side reference superheat degree (3 degrees Celsius in the present embodiment).

The thermosensitive expansion valve 13 may be a mechanical structure that has a thermosensitive portion including a deformable member (diaphragm) configured to deform depending on temperature and pressure of the refrigerant on the outlet side of the outflow side evaporation portions of the evaporator unit 30, the mechanical structure being configured to change the valve opening degree (that is, the flow rate of the refrigerant) depending on the deformation of the deformable member.

A module inlet 21a provided on a body portion 21 of an ejector module 20 is connected to an outlet of the thermosensitive expansion valve 13. In the ejector module 20, constituent devices of the cycle surrounded by a dash-dotted line in FIG. 1 are formed integrally with each other (that is, modularized). Specifically, in the ejector module 20, the branch portion 14, an ejector 15, a variable throttle mechanism 16 and the like are integrated with each other.

The body portion 21 of the ejector module 20 is formed of metallic (aluminum in the present embodiment) constituent members integrated with each other. The body portion 21 forms an outer body of the ejector module 20 (that is, constituent devices of the cycle surrounded by a dash-dotted line in FIG. 1). The body portion 21 defines a part of the ejector 25, the variable throttle mechanism 26, and the like. The body portion 21 may be made of resin.

Refrigerant passages and internal spaces are defined inside the body portion 21. On the outer surface of the body portion 21, outlets and inlets of the refrigerant such as the module inlet 21a, a refrigerant suction port 21b, an ejector side outlet 21c, a throttle side outlet 21d, a low-pressure inlet 21e, and a module outlet 21f are provided.

The module inlet 21a is a refrigerant inlet through which the refrigerant flowing out of the thermosensitive expansion valve 13 flows into the ejector module 20. The module inlet 21a communicates with an inlet side of the branch portion 14.

The branch portion 14 divides the flow of the refrigerant flowing out of the radiator 12 (specifically, the refrigerant flowing out of the thermosensitive expansion valve 13) into one flow and the other flow. The refrigerant of the one flow flows toward a nozzle portion 15a of the ejector 15, and the refrigerant of the other flow flows toward an inlet of the variable throttle mechanism 16. Refrigerant passages defined in the body portion 21 of the ejector module 20 are connected to each other at the branch portion 14.

The ejector includes the nozzle portion 15a configured to decompress and eject the refrigerant of the one flow and functions as a refrigerant decompressor. The ejector 15 functions as a refrigerant circulator configured to circulate the refrigerant by drawing the refrigerant from an outside using the suction effect of the ejected refrigerant ejected from the nozzle portion 15a. Specifically, the ejector 15 is configured to draw the refrigerant flowing out of a suction side evaporation portion 18b of the evaporator unit 30 described later.

In addition, the ejector 15 functions as an energy conversion device that increases the pressure of a mixed refrigerant of the refrigerant ejected from the nozzle portion 15a and the refrigerant drawn through the refrigerant suction port 21b by converting kinetic energy of the mixed refrigerant into pressure energy.

Specifically, the ejector 15 includes the nozzle portion 15a and a diffuser portion 15b. The nozzle portion 15a is configured to isentropically decompress the refrigerant in the refrigerant passage defined inside the nozzle portion 15a and discharge the refrigerant. The nozzle portion 15a is made of a substantially cylindrical metal (in the present embodiment, a stainless steel alloy or brass) that tapers in the flow direction of the refrigerant. The nozzle portion 15a is fixed to the body portion 21 by press fitting, for example.

The nozzle portion 15a is a fixed nozzle portion in which a smallest refrigerant passage area is constant. The nozzle portion 15a includes a throat portion at which a passage cross-sectional area of the refrigerant passage is the smallest in the refrigerant passage. The nozzle portion 15a further includes a diffuser portion that increases the passage cross-sectional area of the refrigerant passage. Specifically, the diffuser portion increases the passage cross-sectional area from the throat portion to a refrigerant ejection port from which the nozzle portion 15a discharges the refrigerant. That is, the nozzle portion 15a is a Laval nozzle.

In the present embodiment, a flow rate of the ejected refrigerant discharged from the refrigerant ejection port of the nozzle portion 15a becomes faster than the speed of sound in a normal operation of the ejector refrigeration circuit 10. The nozzle portion 15a may be a tapered nozzle.

The diffuser portion 15b is a pressure increasing portion configured to increase the pressure of the mixed refrigerant. The refrigerant passage defined in the diffuser portion 15b has a substantially truncated cone shape in which the passage cross-sectional area gradually increases toward the downstream side in the refrigerant flow. In the diffuser portion 15b, the kinetic energy of the refrigerant can be converted into pressure energy with such a passage shape.

The body portion 21 has the ejector side outlet 21c through which the refrigerant whose pressure was increased in the diffuser portion 15b flows out of the ejector module 20. The diffuser portion 15b of the present embodiment is formed integrally with the body portion 21. The diffuser portion 15b may be provided as a member separated from the body portion 21 and fixed to the body portion 21 by press fitting, for example.

The variable throttle mechanism 16 is a suction side decompressor configured to decompress the refrigerant of the other flow branched at the branch portion 14 and to regulate a suction side refrigerant flow rate Ge that is a flow rate of the refrigerant flowing into the variable throttle mechanism 16 through the branch portion 14. The suction side refrigerant flow rate Ge is a flow rate of the refrigerant flowing into the suction side evaporation portion 18b.

The basic configuration of the variable throttle mechanism 16 is the same as that of the thermosensitive expansion valve 13. The variable throttle mechanism 16 is configured to change the throttle degree (that is, a refrigerant passage area) such that the superheat degree of the refrigerant flowing out of the suction side evaporation portion 18b of the evaporator unit 30 approaches a predetermined suction side reference superheat degree (0 degrees Celsius in the present embodiment).

As described above, in the present embodiment, the nozzle portion 15a of the ejector 15 is a fixed nozzle portion. Accordingly, the nozzle side refrigerant flow rate Gn that is a flow rate of the refrigerant flowing into the nozzle portion 15a of the ejector 15 through the branch portion 14 can be adjusted by the variable throttle mechanism 16 regulating the suction side refrigerant flow rate Ge.

That is, the variable throttle mechanism 16 is configured to function as a flow rate proportion adjuster that regulates a flow rate proportion n of the suction side refrigerant flow rate Ge in the sum of the nozzle side refrigerant flow rate Gn and the suction side refrigerant flow rate Ge ($\eta = Ge/(Gn+Ge)$). The nozzle side refrigerant flow rate Gn and the suction side refrigerant flow rate Ge are both mass flow rates.

In the present embodiment, the variable throttle mechanism 16 is configured to change the throttle degree such that the superheat degree of the refrigerant flowing out of the suction side evaporation portion 18b approaches the suction side reference superheat degree during the normal operation of the ejector refrigeration circuit 10. As a result, the flow rate proportion n approaches the predetermined reference flow rate proportion Kn. The reference flow rate proportion Kη may be determined such that the cooling capacities of the outflow side evaporation portion and the suction side evaporation portion 18b for cooling the blown air approach the maximum value at the reference flow rate proportion Kη as much as possible.

The body portion 21 has the throttle side outlet 21d through which the refrigerant flowing through the variable throttle mechanism 16 flows out of the ejector module 20. The body portion 21 has the low-pressure inlet 21e through which the refrigerant that flowed out of the outflow side evaporation portion of the evaporator unit 30 flows into the ejector module 20, and the module outlet 21f through which the refrigerant that flowed through the low-pressure inlet 21e flows out of the ejector module 20 toward the inlet side of the compressor 11.

The evaporator unit 30 will be next described. In the evaporator unit 30, a windward evaporator 17, a leeward evaporator 18 and the like are integrated with each other and surrounded by a dot-dot dash line in FIG. 1. The windward evaporator 17 and the leeward evaporator 18 of the ejector refrigeration cycle 10 are heat absorption heat exchangers that are configured to cool the blown air using a heat absorbing effect of the refrigerant evaporated by exchanging heat with the blown air blown by the blower 30a toward the passenger compartment.

The heat exchange portions of the windward evaporator 17 and the leeward evaporator 18 are partitioned into heat exchange portions such as a first outflow side evaporation portion 17a, a second outflow side evaporation portion 18a, a third outflow side evaporation portion 17b, and a suction side evaporation portion 18b.

Specifically, the first outflow side evaporation portion 17a, the second outflow side evaporation portion 18a, and the third outflow side evaporation portion 17b are the heat exchange portions for evaporating the refrigerant flowing from the ejector side outlet 21c of the ejector module 20. The suction side evaporation portion 18b is a heat exchange portion for evaporating the refrigerant flowing out from the throttle side outlet 21d of the ejector module 20 and allows the refrigerant to flow toward the refrigerant suction port 21b of the ejector module 20.

Since the first outflow side evaporation portion 17a, the second outflow side evaporation portion 18a, and the third outflow side evaporation portion 17b are the heat exchange portions for evaporating the refrigerant flowing out from the ejector side outlet 21c, the three heat exchange portions may be referred to collectively as outflow side evaporation portions.

Specifically, the windward evaporator 17 includes the first outflow side evaporation portion 17a and the third outflow side evaporation portion 17b. The first outflow side evaporation portion 17a is a heat exchange portion for evaporating a part of the refrigerant flowing out from the ejector side outlet 21c.

The third outflow side evaporation portion 17b is a heat exchange portion for evaporating a mixture of the refrigerant flowing out of the first outflow side evaporation portion 17a and the refrigerant flowing out of the second outflow side evaporation portion 18a of the leeward evaporator 18. The refrigerant outlet of the third outflow side evaporation portion 17b is connected to the low-pressure inlet 21e of the ejector module 20.

The leeward evaporator 18 includes the second outflow side evaporation portion 18a and the suction side evaporation portion 18b. The second outflow side evaporation portion 18a is a heat exchange portion for evaporating the remaining parts of the refrigerant flowing out from the ejector side outlet 21c. The suction side evaporation portion 18b is a heat exchange portion for evaporating the refrigerant flowing out from the throttle side outlet 21d. The refrigerant outlet of the suction side evaporation portion 18b is connected to the refrigerant suction port 21b of the ejector module 20.

That is, in the present embodiment, all parts of the windward evaporator 17 and a part of the leeward evaporator 18 are the outflow side evaporation portions configured to evaporate the refrigerant flowing out from the ejector side outlet 21c and to allow the refrigerant to flow toward the suction side of the compressor 11. The remaining parts of the leeward evaporator 18 are the suction side evaporation portion configured to evaporate the refrigerant flowing out from the throttle side outlet 21d and to allow the refrigerant to flow toward the refrigerant suction port 21b.

The windward evaporator 17 and the leeward evaporator 18 are arranged in series in the flow of the blown air, and the leeward evaporator 18 is located downstream of the windward evaporator 17 in the flow of the blown air. That is, the leeward evaporator 18 exchanges heat between the refrigerant and the blown air that flowed through the windward evaporator 17.

Accordingly, at least a part of the first outflow side evaporation portion 17a overlaps the second outflow side evaporation portion 18a when they are viewed in the flow direction of the blown air. Further, at least a part of the third outflow side evaporation portion 17b overlaps the suction side evaporation portion 18b.

The blower 30a is an electric blower having rotational speed (blown air volume) controlled in accordance with control voltage output from the air-conditioning controller 40.

Next, the integration of the windward evaporator 17 and the leeward evaporator 18 will be described with reference to FIG. 2. The windward evaporator 17 and the leeward evaporator 18 are each configured as a so-called tank-and-tube type heat exchanger. The windward evaporator 17 and the leeward evaporator 18 are integrated with each other by brazing the constituents of the windward evaporator 17 and the constituents of the leeward evaporator 18 together.

Specifically, the windward evaporator 17 includes windward tubes 71, a pair of windward tanks 72, 73, and the like. The windward tubes 71 are refrigerant tubes through which the refrigerant flows. The windward tubes 71 are flat tubes each having a flat shape in a cross-section. The windward tubes 71 are made of a metal (aluminum alloy in the present embodiment) having excellent heat conductivity.

The windward tubes 71 are arranged one by one along a stacking direction so that outer flat surfaces (i.e., outer planform surfaces) are parallel to each other and that the windward tubes 71 are spaced from each other. As a result, an air passage through which the blown air flows is formed between the adjacent windward tubes 71. Thus, by stacking the windward tubes 71, the windward evaporator 17 has a heat exchanging portion (i.e., a heat exchanging core) that performs the heat exchange between the refrigerant and the blown air.

A fin 74 promoting the heat exchange between the refrigerant and the blown air is disposed in the air passage defined between each adjacent two tubes of the windward tubes 71. The fin 74 is a corrugated fin made of the same material as the windward tubes 71. The corrugated fin is formed by bending a thin plate material into a wave shape. The windward tubes 71, the leeward tubes 81, and the fins 74 are only partially shown in FIGS. 2, 3 for the sake of clarity.

The pair of the windward tanks 72, 73 are refrigerant tanks respectively connected to ends of the windward tubes 71 to collect and distribute the refrigerant flowing through the windward tubes 71. The windward tanks 72, 73 are made of the same material as that of the windward tubes 71. In the following description, one of the windward tanks located above the other one of the windward tanks is referred to as an upper windward tank 72, and the other one of the windward tanks is referred to as a lower windward tank 73.

The windward tanks 72, 73 are formed of bottomed tubular members. The windward tanks 72, 73 and the windward tubes 71 are made of the same material. Each of the windward tanks 72, 73 extends along the stacking direction along which the windward tubes 71 are stacked with each other. Separators that partition inner space of the windward tanks 72, 73 are disposed in the windward tanks 72, 73.

A base structure of the leeward evaporator 18 is similar to the above-described structure of the windward evaporator 17. That is, the leeward evaporator 18 includes leeward tubes 81, a pair of leeward tanks (specifically, an upper leeward tank 82 located above the other one of the leeward tanks, and a lower leeward tank 83 located below the upper leeward tank 82), fins 74, and the like. Separators that partition inner space of the leeward tanks 82, 83 are disposed in the leeward tanks 82, 83.

The evaporator unit 30 includes a center tank 30b. The center tank 30b is formed of a bottomed tubular member. The center tank 30b is made of the same material as that of the windward tanks 72, 73, and the leeward tanks 82, 83. The center tank 30b of the present embodiment extends along the same direction as the windward tanks 72, 73, and the leeward tanks 82, 83.

One end of the center tank 30b is connected to the ejector side outlet 21c of the ejector module 20. That is, the inner space of the center tank 30b communicates with the ejector side outlet 21c of the ejector module 20. Accordingly, the refrigerant flowing out of the ejector module 20 from the ejector side outlet 21c flows into the inner space of the center tank 30b.

The center tank 30b is located between the upper windward tank 72 and the upper leeward tank 82. The outer surfaces of the center tank 30b and the upper windward tank 72 are joined with each other, and the inner space of the center tank 30b communicates with the inner space of the upper windward tank 72 through the joined part. The outer surfaces of the center tank 30b and the upper leeward tank 82 are joined with each other, and the inner space of the center tank 30b communicates with the inner space of the upper leeward tank 82 through the joined part.

The evaporator unit 30 is formed as a single unit as described above. Refrigerant passages in the evaporator unit 30 will be described hereafter. The refrigerant flowing out of the ejector module 20 through the ejector side outlet 21c flows into the inner space of the center tank 30b as illustrated with a thick solid arrow in FIG. 2.

The inner space of the center tank 30b communicates with the inner space of the upper windward tank 72 and the inner space of the upper leeward tank 82. Accordingly, the refrigerant flowing into the inner space of the center tank 30b is branched into a part flowing into the inner space of the upper windward tank 72 and the remaining parts flowing into the inner space of the upper leeward tank 82.

The refrigerant flowing into the upper windward tank 72 of the windward evaporator 17 flows downward through the windward tubes 71 of the first outflow side evaporation portion 17a, and then the refrigerant flows into the lower windward tank 73. The refrigerant flowing into the upper leeward tank 82 of the leeward evaporator 18 flows downward through the leeward tubes 81 of the second outflow side evaporation portion 18a, and then the refrigerant flows into the lower leeward tank 83.

The refrigerant flowing out of the windward tubes of the first outflow side evaporation portion 17a and the refrigerant flowing out of the leeward tubes 81 of the second outflow side evaporation portion 18a join together in the lower windward tank 73 of the windward evaporator 17.

The refrigerant that joined together in the lower windward tank 73 flows upward through the windward tubes 71 of the third outflow side evaporation portion 17b, and then the refrigerant flows into the upper windward tank 72. The refrigerant flowing into the upper windward tank 72 through the third outflow side evaporation portion 17b flows out of the upper windward tank 72, and then the refrigerant flows into the ejector module 20 from the low-pressure inlet 21e.

Figure 2:
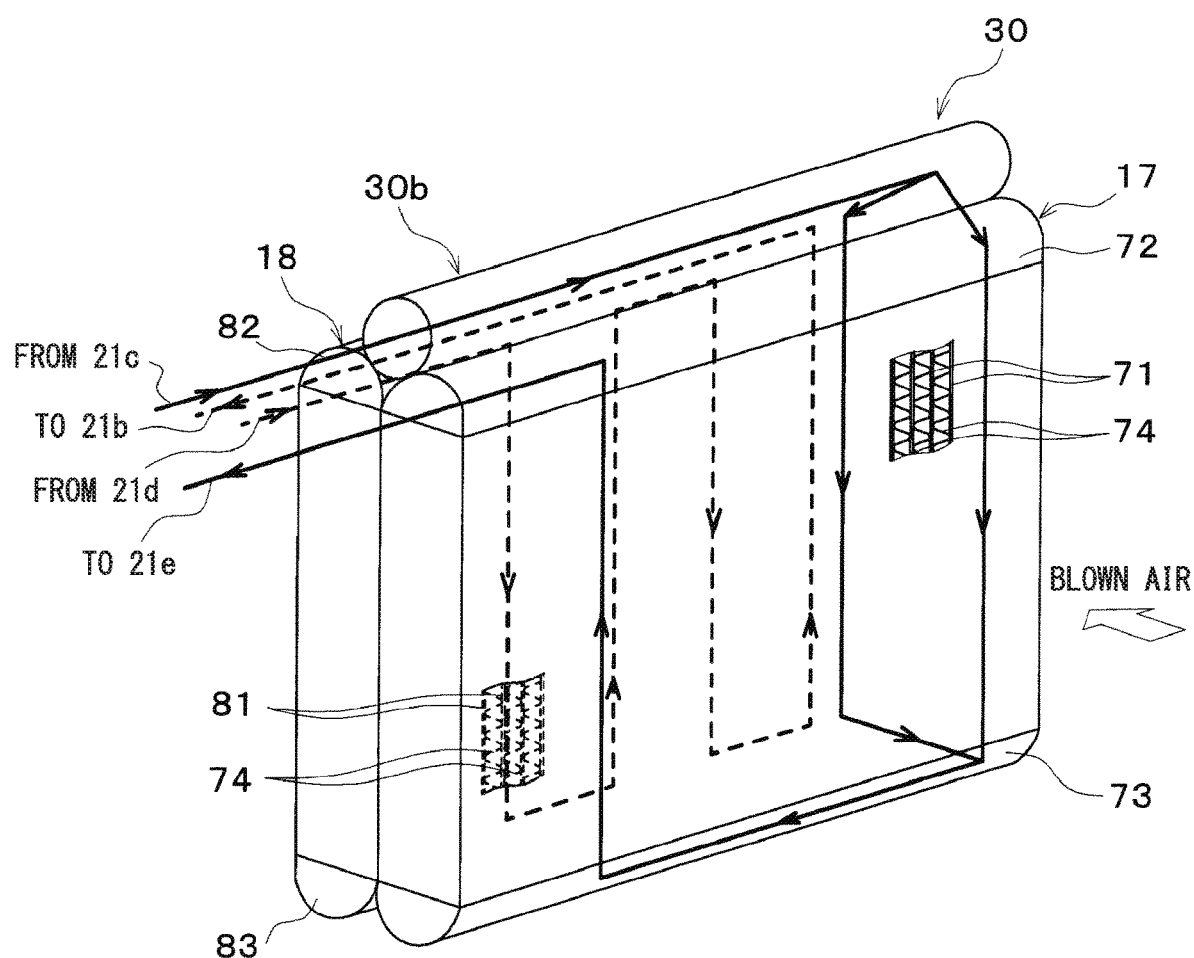
FIG. 2 is an explanatory diagram for explaining as to how refrigerant flows in an evaporator unit of at least one embodiment of the present disclosure.

The refrigerant flowing out of the ejector module 20 from the throttle side outlet 21d flows into the upper leeward tank 82 of the leeward evaporator 18 as illustrated with a thick dashed arrow in FIG. 2. Subsequently, the refrigerant flows through the leeward tubes 81 of the suction side evaporation portion 18b, and then the refrigerant flows into the upper leeward tank 82 again.

In detail, in the present embodiment, the flow direction of the refrigerant flowing into the upper leeward tank 82 of the leeward evaporator 18 is changed by the separators in the leeward tanks 82, 83 three times such that the refrigerant flows in W-shape in the suction side evaporation portion 18b, and then the refrigerant flows into the upper leeward tank 82 again. Subsequently, the refrigerant flowing into the upper leeward tank 82 through the suction side evaporation portion 18b flows out of the upper leeward tank 82, and then the refrigerant flows into the ejector module 20 from the refrigerant suction port 21b.

Figure 3:
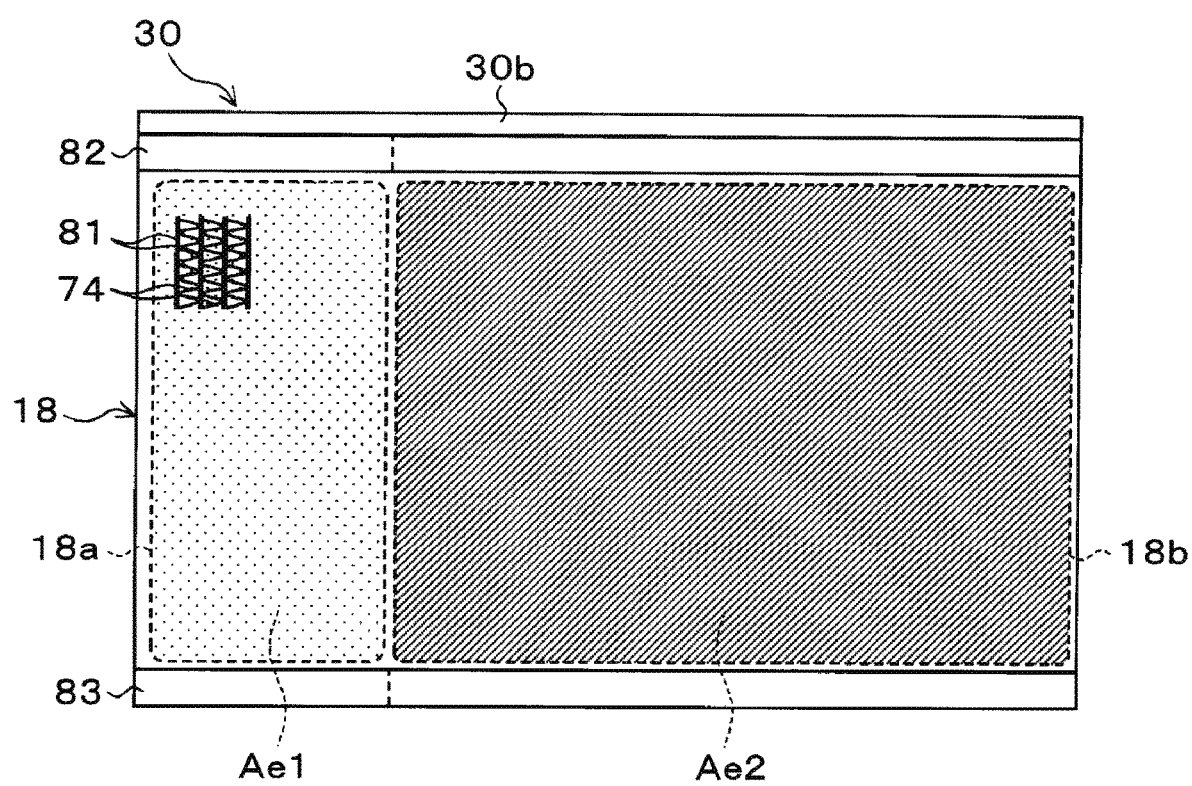
FIG. 3 is an explanatory diagram for explaining proportion of areas in an evaporator unit of at least one embodiment of the present disclosure.

As described above, the heat exchange portion of the leeward evaporator 18 is divided into the second outflow side evaporation portion 18a and the suction side evaporation portion 18b as illustrated with dashed lines in FIG. 3. In the present embodiment, an area of the heat exchange portion of the second outflow side evaporation portion 18a shown with dot hatch is defined as an outflow side heat exchange area Ae1, and an area of the heat exchange portion of the suction side evaporation portion 18b shown with hatching line is defined as a suction side heat exchange area Ae2. In the present embodiment, the area of the heat exchange portion is an area of the leeward evaporator 18 viewed in the flow direction of the blown air.

The refrigerant evaporation temperature in the second outflow side evaporation portion 18a is defined as an outflow side evaporation temperature Te1, and the refrigerant evaporation temperature in the suction side evaporation portion 18b is defined as a suction side evaporation temperature Te2. In the present embodiment, the outflow side evaporation temperature Te1 is an average value of the refrigerant evaporation temperatures at several points of the second outflow side evaporation portion 18a. The suction side evaporation temperature Te2 is an average value of the refrigerant evaporation temperatures at several points of the suction side evaporation portion 18b.

In the present embodiment, an area proportion Ap of the suction side heat exchange area Ae2 in the outflow side heat exchange area Ae1 and the suction side heat exchange area Ae2 (Ap=Ae2/(Ae1+Ae2)) is designed such that a temperature difference $\Delta Te$ between the outflow side evaporation temperature Te1 and the suction side evaporation temperature Te2 ($\Delta Te=Te1-Te2$) is at or below a reference temperature difference $K\Delta Te$ (5 degrees Celsius in the present embodiment) when the flow rate proportion $\eta$ is at the reference flow rate proportion $K\eta$. The reference temperature difference $K\Delta Te$ may be determined such that non-uniformity of the temperature of the blown air flowing through the evaporator unit 30 is not uncomfortable to occupants.

Figure 4:
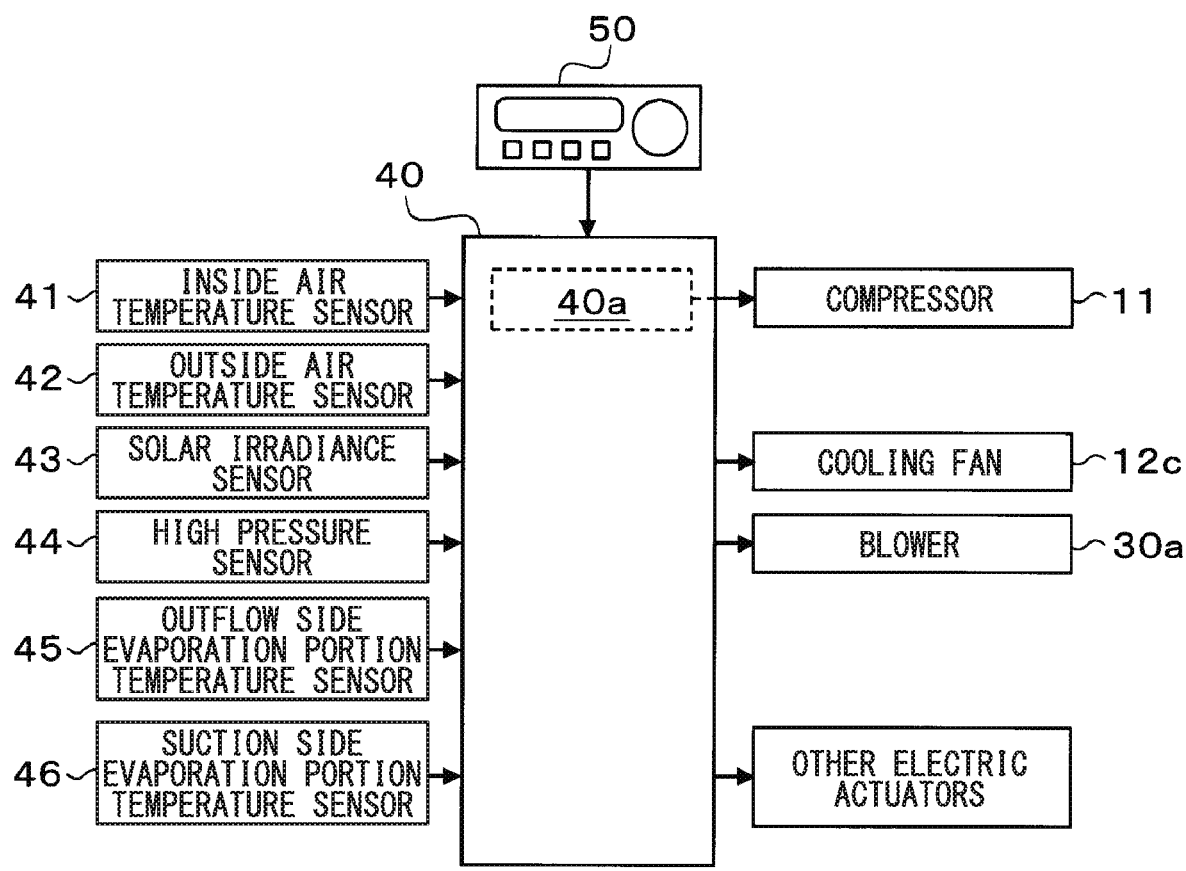
FIG. 4 is a block diagram illustrating an electric controller of an ejector refrigeration cycle according to at least one embodiment of the present disclosure.

An electric controller of the ejector refrigeration circuit 10 in the present embodiment will be described hereafter with reference to FIG. 4. The air-conditioning controller 40 is configured by a known microcomputer including a CPU, a ROM, a RAM, and the like and peripheral circuits of the microcomputer. The air-conditioning controller 40 performs calculations and processing based on control programs stored in the ROM to control the control target devices 11, 12c, 30a and the like connected with the output side of the air-conditioning controller 40.

The input side of the air-conditioning controller 40 is connected to sensors for air-conditioning such as the inside air temperature sensor 41, the outside air temperature sensor 42, the solar irradiance sensor 43, the high-pressure sensor 44, the outflow side evaporation portion temperature sensor 45, and the suction side evaporation portion temperature sensor 46. The air-conditioning controller 40 receives the detection values from the sensors for air-conditioning.

The inside air temperature sensor 41 is a passenger compartment temperature detector configured to detect the temperature of the passenger compartment. The outside air temperature sensor 42 is an outside air temperature detector configured to detect the outside air temperature. The solar irradiance sensor 43 is a solar irradiance detector configured to detect a solar irradiance entering the passenger compartment. The high-pressure sensor 44 is a high-pressure detector configured to detect pressure of the high-pressure side refrigerant flowing from the discharge port of the compressor 11 toward the inlet of the thermosensitive expansion valve 13.

The outflow side evaporation portion temperature sensor 45 is an outflow side evaporation temperature detector configured to detect the outflow side evaporation temperature Te1. The suction side evaporation portion temperature sensor 46 is a suction side evaporation temperature detector configured to detect the suction side evaporation temperature Te2.

The outflow side evaporation portion temperature sensor 45 is constituted by temperature sensors each of which respectively detects a part of the fins 74 of the second outflow side evaporation portion 18a of the leeward evaporator 18. The suction side evaporation portion temperature sensor 46 is constituted by temperature sensors each of which respectively detects a part of the fins 74 of the suction side evaporation portion 18b.

The input side of the air-conditioning controller 40 is connected with an operation panel 50, and the air-conditioning controller 40 receives operation signals from operations switches provided on the operation panel 50. The various operation switches provided with the operation panel 50 include an air-conditioning operation switch for requesting an air-conditioning of the passenger compartment and an inside-air temperature setting switch for setting a temperature in the passenger compartment.

The air-conditioning controller 40 is integrated with a control unit for controlling the operations of various control target devices connected to the output side of the control device. A configuration (hardware and software) of the air-conditioning controller 40, which controls the operations of the respective control target devices, forms the control unit of the respective control target devices. For example, in the present embodiment, the configuration for controlling the refrigerant discharge capacity of the compressor 11 is the discharge capacity control unit 40a.

Next, the operation of the ejector refrigeration cycle 10 according to the present embodiment having the above-described configuration will be described. First, the air-conditioning controller 40 executes an air-conditioning control program preliminarily stored in the ROM in response to a turning on of an air-conditioning actuation switch of the operation panel 50. Each control step in the air-conditioning control program constitutes a function realization unit included in the air-conditioning controller 40.

In the air-conditioning control program, a target flow-out temperature TAO of the blown air conveyed to the passenger compartment is determined based on the detection signals from the above-described sensors for air-conditioning and operation signals from the operation panel 50.

The target flow-out temperature TAO correlates with a thermal load of the ejector refrigeration cycle 10. The compressor 11, the cooling fan 12c, the blower 30a and the like are controlled based on the target flow-out temperature TAO (that is, based on the thermal load). As a result, the compressor 11 draws the refrigerant, compresses the refrigerant, and discharges the refrigerant.

The refrigerant having the high temperature and the high pressure discharged from the compressor 11 flows into the radiator 12. The radiator 12 condenses the refrigerant in the condensing portion 12a by performing a heat exchange between the refrigerant and the outside air flowing from the cooling fan 12c. The refrigerant cooled in the condensing portion 12a is divided into gas refrigerant and liquid refrigerant in the receiver 12b.

The liquid-phase refrigerant separated in the receiver 12b flows into the thermosensitive expansion valve 13. The refrigerant is decompressed by the thermosensitive expansion valve 13 in an isenthalpic manner to become an intermediate-pressure refrigerant. The valve opening degree of the thermosensitive expansion valve 13 is adjusted such that the superheat degree of the refrigerant flowing out of the outflow side evaporation portion of the evaporator unit 30 (specifically, the third outflow side evaporation portion 17b) approaches the outflow side reference superheat degree.

The refrigerant decompressed by the thermosensitive expansion valve 13 flows into the ejector module 20 from the module inlet 21a. The refrigerant that flowed into the ejector module 20 is branched at the branch portion 14. The refrigerant of the one flow flows into the nozzle portion 15a of the ejector 15. The nozzle portion 15a decompresses the refrigerant isentropically and discharges the decompressed refrigerant as the ejected refrigerant. The refrigerant suction port 21b draws in the refrigerant from the suction side evaporation portion 18b of the leeward evaporator 18 by using suction force of the ejected refrigerant.

The ejected refrigerant discharged from the nozzle portion 15a and the suction refrigerant drawn in from the refrigerant suction port 21b flow into the diffuser portion 15b of the ejector 15 and are mixed together. Since the diffuser portion 15b increases the passage cross-sectional area, velocity energy of the refrigerant is converted into pressure energy.

As such, a pressure of the mixed refrigerant of the ejected refrigerant and the suction refrigerant rises.

The refrigerant flowing out of the diffuser portion 15b flows out of the ejector module 20 from the ejector side outlet 21c, and then the refrigerant flows into the inner space of the center tank 30b of the evaporator unit 30. The refrigerant that flowed into the center tank 30b flows into the first outflow side evaporation portion 17a of the windward evaporator 17 and the second outflow side evaporation portion 18a of the leeward evaporator 18 which are connected in parallel with each other.

The refrigerant that flowed into the first outflow side evaporation portion 17a of the windward evaporator 17 absorbs heat of the blown air blown by the blower 30a and evaporates. As a result, the blown air is cooled. The refrigerant that flowed into the second outflow side evaporation portion 18a of the leeward evaporator 18 absorbs heat of the blown air that passed through the first outflow side evaporation portion 17a and evaporates. Accordingly, the blown air that passed through the first outflow side evaporation portion 17a is further cooled.

The refrigerant that flowed out of the first outflow side evaporation portion 17a and the second outflow side evaporation portion 18a join together and flow into the third outflow side evaporation portion 17b of the windward evaporator 17. The refrigerant that flowed into the third outflow side evaporation portion 17b absorbs heat of the blown air blown by the blower 30a and evaporates. As a result, the blown air is cooled.

The refrigerant that flowed out of the third outflow side evaporation portion 17b flows into the ejector module 20 from the low-pressure inlet 21e. The refrigerant that flowed into the ejector module 20 from the low-pressure inlet 21e flows out through the module outlet 21f. The refrigerant that flowed out of the ejector module 20 from the module outlet 21f is drawn into the compressor 11 and compressed again.

The refrigerant of the other flow branched at the branch portion 14 is decompressed by the variable throttle mechanism 16 in an isenthalpic manner to become a low-pressure refrigerant. The valve opening degree of the variable throttle mechanism 16 is regulated such that the superheat degree of the refrigerant flowing out of the evaporator unit 30 from the suction side evaporation portion 18b approaches the suction side reference superheat degree. As a result, the flow rate proportion η approaches the reference flow rate proportion Kη.

The low-pressure refrigerant that was decompressed by the variable throttle mechanism 16 flows into the suction side evaporation portion 18b of the leeward evaporator 18. The refrigerant that flowed into the suction side evaporation portion 18b absorbs heat of the blown air that passed through a part of the first outflow side evaporation portion 17a and the third outflow side evaporation portion 17b and evaporates. Accordingly, the blown air that passed through a part of the first outflow side evaporation portion 17a and the third outflow side evaporation portion 17b is further cooled. The refrigerant that flowed out of the suction side evaporation portion 18b is drawn into the ejector 15 from the refrigerant suction port 21b.

Thus, according to the ejector refrigeration cycle 10 in the present embodiment, the evaporator unit 30 cools the blown air. The cooled air is conveyed into the passenger compartment, and thus the cooling of the passenger compartment is realized.

Further, in the ejector refrigeration cycle 10 of the present embodiment, the refrigerant that flowed out of the outflow side evaporation portion (i.e. the refrigerant whose pressure was increased by the diffuser portion 15b of the ejector 15) can be drawn into the compressor 11. Accordingly, power consumption of the compressor 11 is reduced, and therefore COP of the ejector refrigeration cycle 10 is improved as compared to conventional refrigeration cycle devices in which a refrigerant evaporation pressure in an evaporator becomes equal to a pressure of the refrigerant drawn into a compressor.

In the ejector refrigeration cycle 10 of the present embodiment, the cycle constituents are integrated with each other to be the ejector module 20 and the evaporator unit 30, and accordingly the mountability of these cycle constituents to the ejector refrigeration cycle 10 can be improved. That is, the productivity of the ejector refrigeration cycle 10 can be improved.

In the ejector refrigeration cycle 10 of the present embodiment, the refrigerant evaporation temperature in the outflow side evaporation portion is higher than the refrigerant evaporation temperature in the suction side evaporation portion 18b due to the pressure increasing effect of the diffuser portion 15b of the ejector 15. Accordingly, the blown air cooled by the evaporator unit 30 is likely to be non-uniform. Specifically, the temperature of the blown air cooled by the outflow side evaporation portion 18a of the leeward evaporator 18 may be higher than the temperature of the blown air cooled by the suction side evaporation portion 18b of the leeward evaporator 18.

In the ejector refrigeration cycle 10 of the present embodiment, the throttle degree of the variable throttle mechanism 16 is changed such that the flow rate proportion $\eta$ becomes the reference flow rate proportion $K\eta$. Accordingly, the cooling capacities of the outflow side evaporation portion and the suction side evaporation portion 18b for cooling the blown air can be brought close to the maximum value as much as possible. That is, a decrease of the cooling capacities of the outflow side evaporation portion and the suction side evaporation portion 18b can be limited.

Further, the area proportion Ap is designed such that the temperature difference $\Delta T$ is at or below the reference temperature difference $K\Delta T$ while the flow rate proportion $\eta$ is equal to the reference flow rate proportion $K\eta$. Accordingly, since the throttle degree of the variable throttle mechanism 16 is changed such that the flow rate proportion $\eta$ is equal to the reference flow rate proportion $K\eta$, the increase of the temperature difference $\Delta T$ is limited, and the increase of the non-uniformity of the temperature of the blown air can be suppressed.

That is, in the ejector refrigeration cycle 10 of the present embodiment, the throttle degree of the variable throttle mechanism 16 is changed such that the temperature difference $\Delta T$ is at or below the reference temperature difference $K\Delta T$. Accordingly, the increase of the temperature difference $\Delta T$ can be limited, and the increase of the non-uniformity of the temperature of the blown air can be suppressed.

Since the flow rate proportion $\eta$ is adjusted in a range where the temperature difference $\Delta T$ is at or below the reference temperature difference $K\Delta T$, the cooling capacities of the outflow side evaporation portion and the suction side evaporation portion 18b can be brought close to the maximum value as much as possible. Accordingly, a decrease of the cooling capacities of the outflow side evaporation portion and the suction side evaporation portion 18b can be limited.

That is, according to the ejector refrigeration cycle 10 of the present embodiment, the decrease of the cooling capacity of the outflow side evaporation portion and the suction side evaporation portion 18b for cooling the blown air can be suppressed, and the increase of the non-uniformity of the temperature of the blown air can be suppressed.

In the ejector module 20 of the ejector refrigeration cycle 10 of the present embodiment, the nozzle portion 15a is a fixed nozzle portion, and variable throttle mechanism 16 is used as a suction side decompressor. Accordingly, the flow rate proportion $\eta$ can be easily regulated by changing the throttle degree (refrigerant passage area) of the variable throttle mechanism 16.

The ejector refrigeration cycle 10 of the present embodiment includes the thermosensitive expansion valve 13 as a high-pressure side decompressor. Accordingly, the superheat degree of the refrigerant flowing out of the outflow side evaporation portion can be controlled to approach the outflow side reference superheat degree. Accordingly, the refrigerant drawn into the compressor 11 can be a gas-phase refrigerant having a superheat degree in regardless of the load on the cycle, and the liquid compression in the compressor 11 can be suppressed.

In the evaporator unit 30 of the ejector refrigeration cycle 10 of the present embodiment, tank- and tube type heat exchangers are used as the windward evaporator 17 and the leeward evaporator 18. Accordingly, the heat exchange portions can be partitioned by the separators disposed in the windward tanks 72, 73, and the leeward tanks 82, 83. Further, the areas of the heat exchange portions can be easily adjusted.

The evaporator unit 30 of the ejector refrigeration cycle 10 of the present embodiment includes the center tank 30b. The inner space of the center tank 30b communicates with the ejector side outlet 21c, the inner space of the upper windward tank 72, and the inner space of the upper leeward tank 82.

Accordingly, the refrigerant that flowed out of the ejector 15 through the diffuser portion 15b can be supplied to the first outflow side evaporation portion 17a of the windward evaporator 17 and the second outflow side evaporation portion 18a of the leeward evaporator 18 through the inner space of the center tank 30b.

The passage area of the communication passage between the center tank 30b and the upper windward tank 72 and the passage area of the communication passage between the center tank 30b and the upper leeward tank 82 can be easily secured. Accordingly, a pressure loss caused when the refrigerant flowing out of the diffuser portion 15b flows into the first outflow side evaporation portion 17a or the second outflow side evaporation portion 18a can be reduced, and the COP of the cycle can be improved.

Second Embodiment

Figure 5:
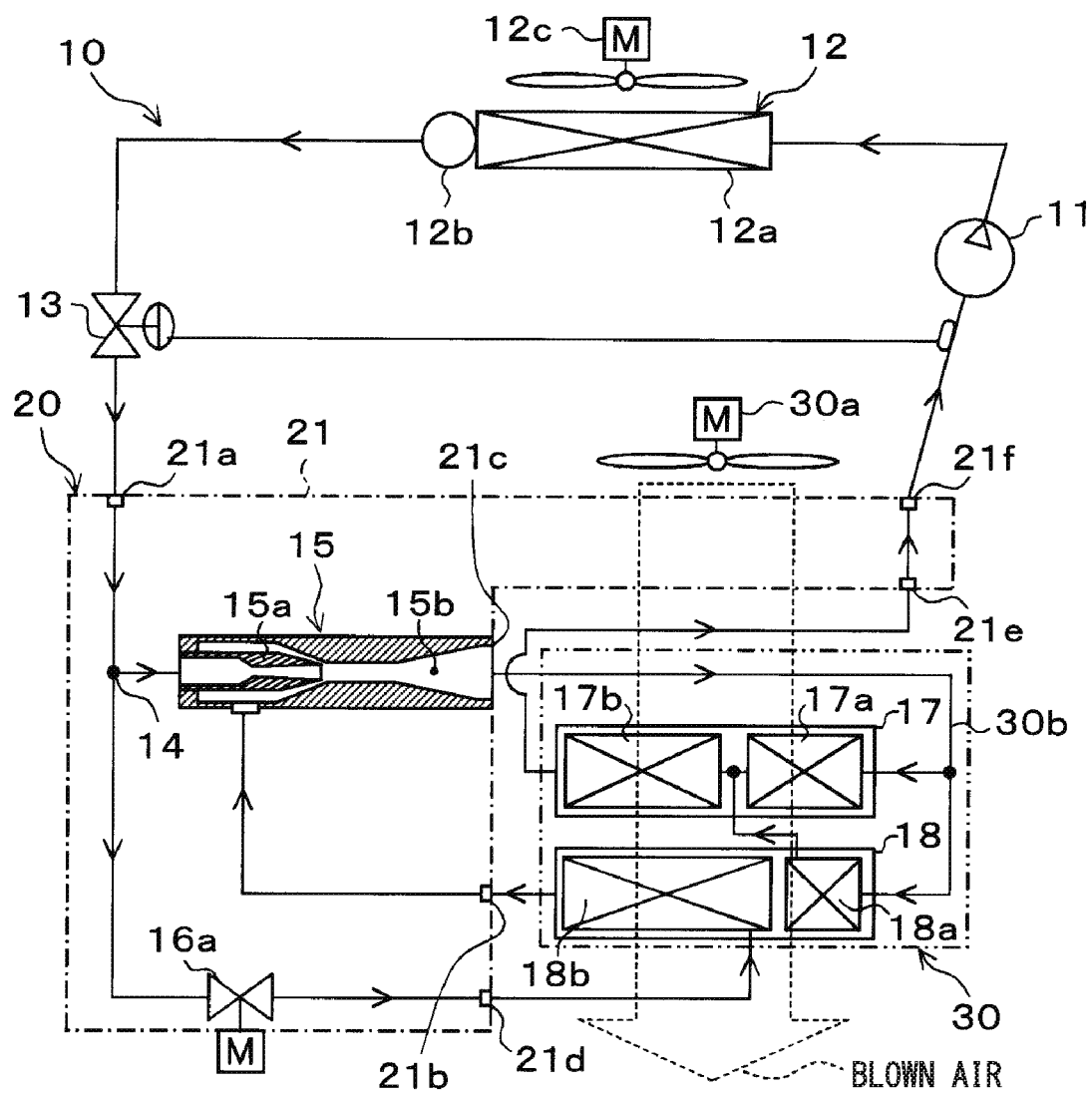
FIG. 5 is a schematic overall view illustrating an ejector refrigeration cycle according to at least one embodiment of the present disclosure.

The present embodiment is different from the first embodiment in that an electric expansion valve 16a is used as the suction side decompressor as shown in FIG. 5. The electric expansion valve 16a is an electric variable throttle device that includes a valve body for changing the throttle degree and an electric actuator (specifically, a stepper motor) for moving the valve body. In FIG. 5, the same or equivalent parts as those of the first embodiment are denoted by the same reference numerals. This also applies to the following drawings.

Figure 6:
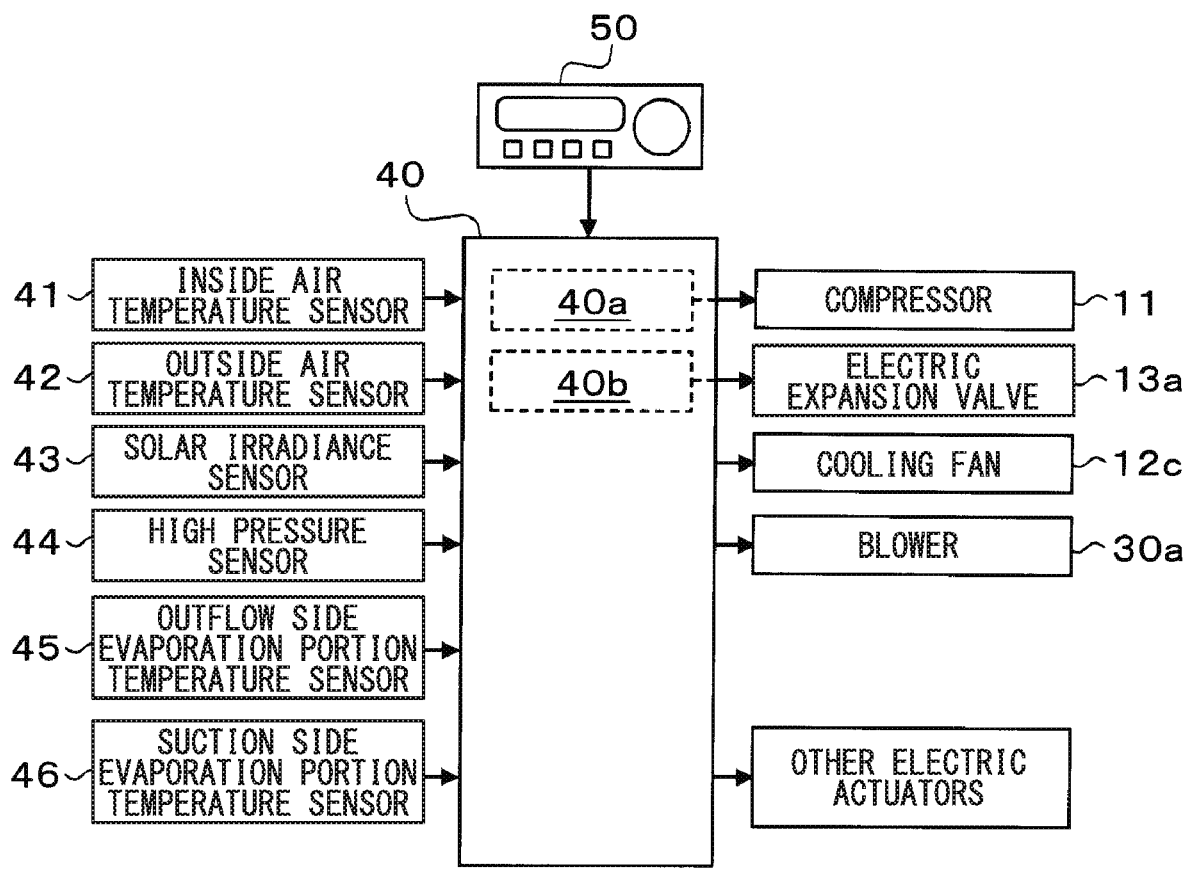
FIG. 6 is a block diagram illustrating an electric controller of an ejector refrigeration cycle according to at least one embodiment of the present disclosure.

The operation of the electric expansion valve 16a is controlled by control signals (control pulses) output from the air-conditioning controller 40. Accordingly, the output side of the air-conditioning controller 40 of the present embodiment is connected with the electric expansion valve 16a as shown in FIG. 6. In the present embodiment, a throttle degree controlling unit 40b is a part of the air-conditioning controller 40 configured to control the operation of the electric expansion valve 16a.

In the present embodiment, the air-conditioning controller 40 controls the operation of the electric expansion valve 16a using a feedback control such that the absolute value of the temperature difference ΔTe between the outflow side evaporation temperature Te1 and the suction side evaporation temperature Te2 becomes at or below the reference temperature difference KΔTe.

Other configurations and operations of the ejector refrigeration cycle 10 are the same as those of the first embodiment. Accordingly, in the ejector refrigeration cycle 10 of the present embodiment, the decrease of the cooling capacity of the outflow side evaporation portion and the suction side evaporation portion 18b for cooling the blown air can be suppressed, and the increase of the non-uniformity of the temperature of the blown air can be suppressed as in the first embodiment.

Third Embodiment

Figure 7:
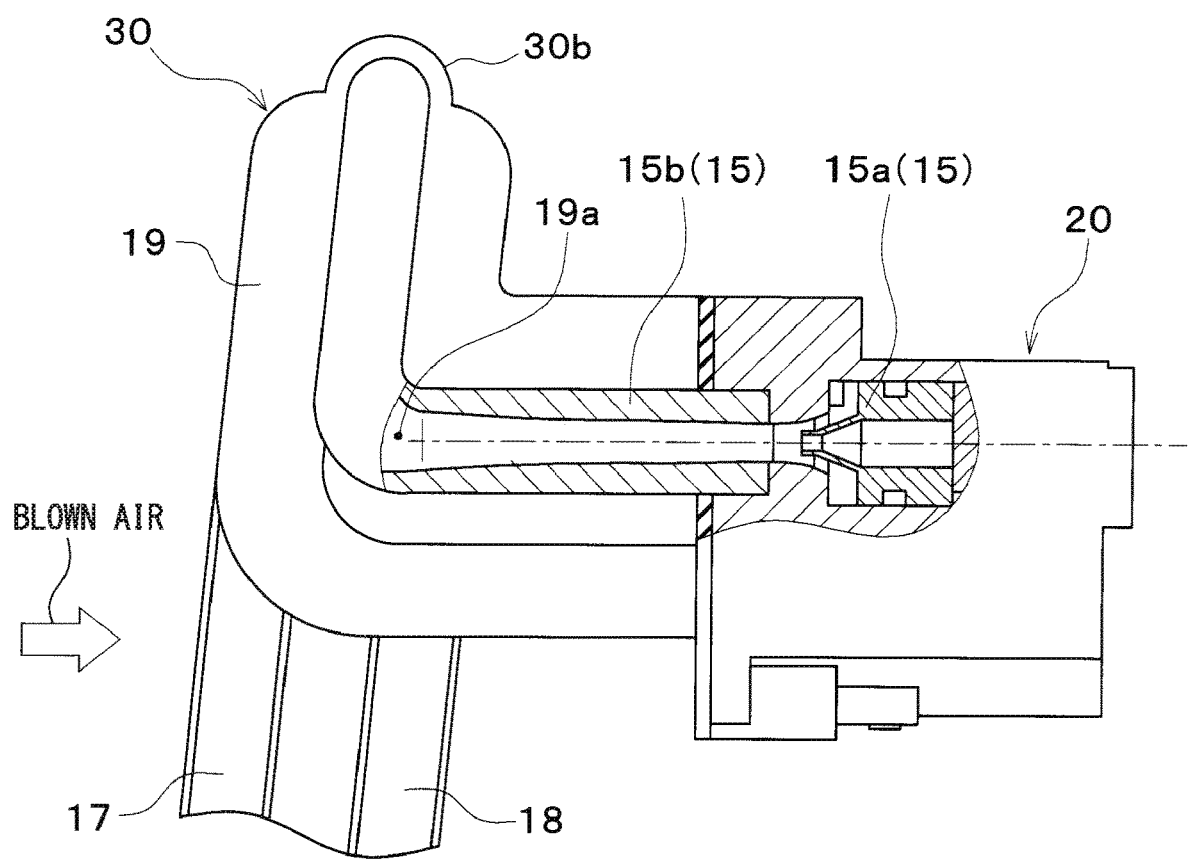
FIG. 7 is a schematic side view for explaining how an ejector module, pipes, and an evaporator unit are connected in at least one embodiment of the present disclosure.
Figure 8:
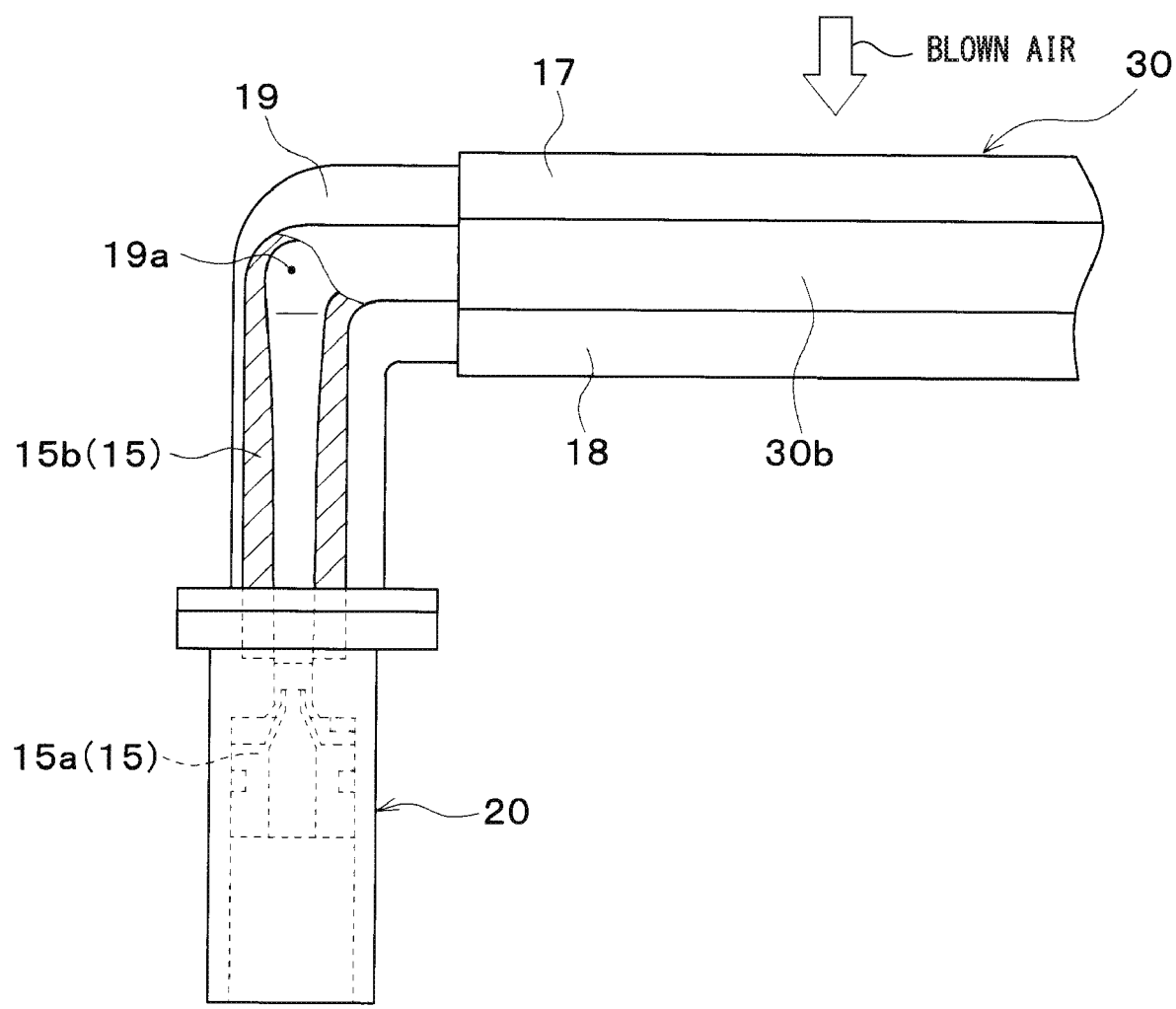
FIG. 8 is a schematic upper view for explaining how an ejector module, pipes, and an evaporator unit are connected in at least one embodiment of the present disclosure.

In the present embodiment, as shown in FIGS. 7, 8, the diffuser portion 15b of the ejector 15 is formed by a part of a connector pipe 19 connecting the ejector module 20 and the evaporator unit 30. That is, in the present embodiment, the diffuser portion 15b is provided as a member separated from the body portion 21 of the ejector module 20.

The connector pipe 19 includes refrigerant pipes made of metal or plate members integrated with each other by brazing, for example. The connector pipe 19 defines connection passages. Specifically, the connector pipe 19 defines, as one of the connection passages, an ejector connection passage 19a that connects the outlet side of the ejector 15 of the ejector module 20 with one end of the center tank 30b of the evaporator unit 30.

In an upstream part of the ejector connection passage 19a in the refrigerant flow, the passage cross-sectional area gradually increases in the flow direction of the refrigerant. In the present embodiment, the upstream part of the ejector connection passage 19a is used as the diffuser portion 15b of the ejector 15.

The connection passages include a refrigerant passage that connects the throttle side outlet 21d of the ejector module 20 to the inlet side of the suction side evaporation portion 18b of the upper leeward tank 82 of the leeward evaporator 18. The connection passages further include a refrigerant passage that connects the outlet of the suction side evaporation portion 18b of the upper leeward tank 82 to the refrigerant suction port 21b of the ejector module 20. The connection passages further include a refrigerant passage that connects the outlet of the outflow side evaporation portion of the upper windward tank 72 of the windward evaporator 17 to the low-pressure inlet 21e of the ejector module 20.

The connection passages are curved. Specifically, in the present embodiment, a direction of the center axis of the nozzle portion 15a and a longitudinal direction of the windward tank 72, 73, the leeward tank 82, 83, and the center tank 30b form approximately right angle as shown in FIGS. 7, 8.

Accordingly, the connector pipes 19 changes the flow directions of the refrigerant flowing out from the refrigerant outlets of the ejector module 20 to flow to the refrigerant outlets of the evaporator unit 30. The connector pipes 19 changes the flow directions of the refrigerant flowing out from the refrigerant outlets of the evaporator unit 30 to flow to the refrigerant inlets of the ejector module 20.

Other configurations and operations of the ejector refrigeration cycle 10 are the same as those of the first embodiment. Accordingly, in the ejector refrigeration cycle 10 of the present embodiment, the decrease of the cooling capacity of the outflow side evaporation portion and the suction side evaporation portion 18b for cooling the blown air can be suppressed, and the increase of the non-uniformity of the temperature of the blown air can be suppressed as in the first embodiment.

In the ejector refrigeration cycle 10 of the present embodiment, the diffuser portion 15b is defined by the ejector connection passages 19a. Accordingly, the length of the diffuser portion 15b can be secured without increasing the size of the ejector refrigeration cycle 10 as a whole. Accordingly, the pressure increasing capacity of the ejector 15 can be easily stabilized.

The present disclosure is not limited to the above-described embodiments. Various modifications, such as modifications described below, may be made without departing from the scope and spirit of the present disclosure.

(1) The above embodiments each exemplify the ejector refrigeration cycle 10 according to the present disclosure applied to the vehicle air conditioner, but the ejector refrigeration cycle 10 is not limited to such application. As an example, the ejector refrigeration cycle 10 may be used for various devices such as a stationary air conditioner and a freezing and refrigerating device.

(2) In the above-described embodiments, the variable throttle mechanism 16 is used as the suction side decompressor. However, the nozzle portion 15a of the ejector 15 may be a variable nozzle that has a narrowest refrigerant passage whose passage cross-sectional area is variable. When the variable nozzle is used as the nozzle portion 15a, the suction side decompressor may be a fixed throttle that has a narrowest refrigerant passage whose passage cross-sectional area is not variable.

In the above-described embodiments, the thermosensitive expansion valve 13 is used as the high-pressure side decompressor. However, the high-pressure side decompressor is not limited to this. For example, an electric expansion valve may be used as the high-pressure side decompressor. In this case, the air-conditioning controller 40 may be configured to control the operation (throttle degree) of the high-pressure side decompressor such that the superheat degree of the refrigerant that flowed out of the evaporator unit 30 is equal to the outflow side reference superheat degree.

The high-pressure side decompressor may be omitted. In this case, the refrigerant in liquid phase surely flows into the nozzle portion 15a of the ejector 15 regardless of the change of the load, the energy conversion efficiency of the ejector 15 can be stabilized. In this case, an accumulator may be provided. The accumulator divides the refrigerant that flowed out of the evaporator unit 30 into gas-phase refrigerant and liquid-phase refrigerant, and the accumulator allows the gas-phase refrigerant to flow out toward the suction side of the compressor 11.

(3) In the above-described third embodiment, the diffuser portion 15b of the ejector 15 is the upstream part of the ejector connection passage 19a of the connector pipe 19 in the refrigerant flow. However, the diffuser portion 15b is not limited to this. For example, the diffuser portion 15b may be an upstream part of the center tank 30b in the refrigerant flow.

(4) Elements forming the ejector refrigeration cycle 10 may not be limited to those described in the above-described embodiments.

As an example, although the compressor 11 is an electric compressor in the above-described embodiments, the compressor 11 may be an engine-driven compressor that is driven by rotational force of an engine for a vehicle transmitted from the engine to the compressor 11 via a pulley, a belt, and the like. Further, such engine-driven compressor may be a variable-capacity compressor whose refrigerant discharge performance is variable by changing a volume of refrigerant discharged by the compressor. As another example, such engine-driven compressor may be a fixed-capacity compressor of which refrigerant discharge performance is variable in a manner that operation rates of the compressor is changed by engaging and disengaging an electromagnetic clutch intermittently.

In the above-described embodiments, the radiator 12 is a condenser integrated with a receiver. However, the radiator 12 may be a so-called subcooling type condenser that has a subcooling portion for subcooling the liquid-phase refrigerant flowing out of the receiver 12b. The radiator may have only the condensing portion 12a.

In the above-described embodiments, the ejector module 20 integrally includes the branch portion 14, the ejector 15, the variable throttle mechanism 16, and the like. However, the branch portion 14, the ejector 15, the variable throttle mechanism 16 may be separated with each other. The ejector module 20 and the evaporator unit 30 may be integrated with each other by pipes.

In addition, in the embodiments described above, although R134a is employed as the refrigerant, the refrigerant is not limited to the above example. For example, R1234yf, R600a, R410A, R404A, R32, R407C, or the like may be employed. Alternatively, a mixture refrigerant or the like in which multiple types of those refrigerants are mixed together may be employed. Further, carbon dioxide may be employed as the refrigerant to configure a supercritical refrigeration cycle in which the high-pressure side refrigerant pressure is equal to or higher than the critical pressure of the refrigerant.

It should be understood that the present disclosure described based on the embodiments is not limited to the embodiments or structures presented herein. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An ejector refrigeration cycle comprising:
   a compressor configured to compress a refrigerant and discharge the refrigerant;
   a radiator configured to release heat of the refrigerant that flowed out of the compressor;
   a branch portion configured to divide a flow of the refrigerant that flowed out of the radiator into one flow and another flow;
   an ejector that has
      a nozzle portion configured to decompress the refrigerant of the one flow that was divided at the branch portion, the refrigerant being ejected from the nozzle portion,
      a refrigerant suction port through which the refrigerant is drawn by a suction force of the ejected refrigerant, and
      a pressure increasing portion in which the refrigerant ejected from the nozzle portion and the refrigerant drawn through the refrigerant suction port are mixed, the pressure increasing portion being configured to increase a pressure of the mixture;
   a suction side decompressor configured to decompress the refrigerant of the other flow that was divided at the branch portion;
   a windward evaporator configured to exchange heat between the refrigerant ejected and a cooling target fluid to evaporate the refrigerant; and
   a leeward evaporator configured to exchange heat between the refrigerant of the other flow and the cooling target fluid that passed through the windward evaporator to evaporate the refrigerant, wherein
   the windward evaporator includes at least one outflow side evaporation portion of a plurality of outflow side evaporation portions configured to evaporate the refrigerant that flowed out of the pressure increasing portion and allow the refrigerant to flow to an inlet of the compressor,
   the leeward evaporator includes
      at least one outflow side evaporation portion of the plurality of outflow side evaporation portions, and
      a suction side evaporation portion configured to evaporate the refrigerant that was decompressed by the suction side decompressor and allow the refrigerant to flow to the refrigerant suction port,
   at least one of the nozzle portion or the suction side decompressor is configured to change an area of a refrigerant passage,
   a nozzle side refrigerant flow rate is a flow rate of the refrigerant flowing from the branch portion into the nozzle portion,
   a suction side refrigerant flow rate is a flow rate of the refrigerant flowing from the branch portion into the suction side decompressor,
   an outflow side heat exchange area is an area of a heat exchange portion of the at least one outflow side evaporation portion of the leeward evaporator,
   a suction side heat exchange area is an area of a heat exchange portion of the suction side evaporation portion of the leeward evaporator,
   an outflow side evaporation temperature is a refrigerant evaporation temperature in the at least one of the plurality of outflow side evaporation portions of the leeward evaporator,
   a suction side evaporation temperature is a refrigerant evaporation temperature in the suction side evaporation portion of the leeward evaporator,
   the at least one of the nozzle portion or the suction side decompressor is configured to adjust the area of the refrigerant passage such that a flow rate proportion of the suction side refrigerant flow rate in a sum of the suction side refrigerant flow rate and the nozzle side refrigerant flow rate is equal to a predetermined reference flow rate proportion, and
   an area proportion of the suction side heat exchange area in a sum of the suction side heat exchange area and the outflow side heat exchange area is designed such that a temperature difference between the outflow side evaporation temperature and the suction side evaporation temperature is at or below a predetermined reference temperature difference while the flow rate proportion is equal to the reference flow rate proportion.

2. The ejector refrigeration cycle according to claim 1, wherein
the nozzle portion is a fixed nozzle in which the area of the refrigerant passage is fixed, and
the suction side decompressor is a variable throttle mechanism configured to change the area of the refrigerant passage.

3. The ejector refrigeration cycle according to claim 1, further comprising:
a high-pressure side decompressor configured to decompress the refrigerant that flowed out of the radiator and allow the refrigerant to flow to an inlet of the branch portion, wherein
the high-pressure side decompressor is a variable throttle mechanism configured to adjust a throttle degree such that a superheat degree of the refrigerant flowing out of the plurality of outflow side evaporation portions approaches a predetermined outflow side reference superheat degree.

4. The ejector refrigeration cycle according to claim 1, wherein
the windward evaporator and the leeward evaporator are integrated with each other to be an evaporator unit,
the windward evaporator includes
a plurality of windward tubes through which the refrigerant flows, and
a windward tank configured to collect and distribute the refrigerant flowing through the plurality of windward tubes,
the leeward evaporator includes
a plurality of leeward tubes through which the refrigerant flows, and
a leeward tank configured to collect and distribute the refrigerant flowing through the plurality of leeward tubes,
the evaporator unit includes a center tank joined with the windward tank and the leeward tank, and
an inner space of the center tank communicates with
an ejector side outlet from which the refrigerant flows out of the pressure increasing portion,
an inner space of the windward tank, and
an inner space of the leeward tank.

5. The ejector refrigeration cycle according to claim 4, wherein
the pressure increasing portion is defined in the center tank or a connector pipe that connects the center tank and the ejector.

* * * * *